United States Patent
Uemachi et al.

(10) Patent No.: US 7,442,758 B2
(45) Date of Patent: Oct. 28, 2008

(54) POLYMER COMPOUND FOR USE IN ELECTRODE MATERIAL, ELECTRODE USING THE SAME AND NONAQUEOUS SOLUTION BATTERY USING THE SAME

(75) Inventors: Hiroshi Uemachi, Kanazawa (JP); Katsunori Nakaya, Wako (JP); Hidehisa Mokudai, Wako (JP)

(73) Assignees: Sensa Corporation, Ishikawa (JP); Honda Motor Co., Ltd., Tokyo (JP)

( * ) Notice: Subject to any disclaimer, the term of this patent is extended or adjusted under 35 U.S.C. 154(b) by 623 days.

(21) Appl. No.: 11/008,250

(22) Filed: Dec. 10, 2004

(65) Prior Publication Data

US 2005/0142441 A1  Jun. 30, 2005

(30) Foreign Application Priority Data

Dec. 11, 2003 (JP) .............................. 2003-412785
Nov. 18, 2004 (JP) .............................. 2004-334093

(51) Int. Cl.
C08G 61/00 (2006.01)
H01M 4/60 (2006.01)
H01M 4/36 (2006.01)
H01M 10/36 (2006.01)
H01M 10/40 (2006.01)

(52) U.S. Cl. ...................... 528/373; 528/377; 528/378; 429/213; 252/182.1

(58) Field of Classification Search ................ 528/373, 528/377, 378; 429/213; 252/182.1
See application file for complete search history.

(56) References Cited

U.S. PATENT DOCUMENTS 4,833,048 A  5/1989  Dejonghe et al.
5,324,599 A * 6/1994  Oyama et al. ............... 429/312
5,852,168 A  12/1998  Barany et al.

OTHER PUBLICATIONS

Yamada et al; Black and white—image formation; 1999; Konica Co., Japan; Chem Abstract 130: 318646.*
Saito et al; Antireflective film and patterning method; 1998; Sony Co. Japan; Chem Abstract 129: 210462.*
Grzeskowiak et al; Chemical—emulsions; 1996; Minnesota mining and manufacturing Co. USA; Chem Abstract 125: 99946.*

(Continued)

*Primary Examiner*—Duc Truong
(74) *Attorney, Agent, or Firm*—Arent Fox LLP.

(57) ABSTRACT

The present invention provides a polymer compound for an electrode material permitting operation at low temperatures and attainment of large capacities, an electrode using the polymer compound, and a nonaqueous solution battery involving the electrode as the positive electrode thereof. The polymer compound includes a structure capable of intramolecularly forming at least one S—S bond in a single side chain of the repeating unit thereof. The S—S bond constitutes a part of a 4- to 6-membered heterocycle. The electrode includes as an electrode material the polymer compound including a structure capable of intramolecularly forming at least one S—S bond in the single side chain of the repeating unit thereof. The nonaqueous solution battery includes a positive electrode, an electrolyte and a negative electrode, and the positive electrode is an electrode including as an electrode material the polymer compound comprising a structure capable of forming at least one S—S bond in the single side chain of the repeating unit thereof.

3 Claims, 6 Drawing Sheets

OTHER PUBLICATIONS

Howell et al; Synthesis—pyrrolidone]; 1996; American chemical society; Chem Abstract 1124: 290405.*

Sun et al; Ultrathin—on gold; 1994; Vacuum, surfaces, and films, 12(4,Pt.2), 1499-56; Chem Abstract 121: 135436.*

Kato et al; Direct writing—platemaking; Fuji photo film Co. Ltd, Japan; 1993; Chem Abstract 120: 311621.*

Meilin Liu et al., "Electrochemical Properties of Organic Disulfide/Thiolate Redox Couples," J. Electrochem. Soc., vol. 136, No. 9, Sep. 1989, pp. 2570-2575.

Steven J. Visco et al., "A Novel Class of Organosulfur Electrodes for Energy Storage," J. Electrochem. Soc., vol. 136, No. 3, Mar. 1989, pp. 661-664.

* cited by examiner

POLYMER COMPOUND FOR USE IN ELECTRODE MATERIAL, ELECTRODE USING THE SAME AND NONAQUEOUS SOLUTION BATTERY USING THE SAME

BACKGROUND OF THE INVENTION

1. Field of the Invention

The present invention relates to a polymer compound for an electrode material, an electrode using the polymer compound and a nonaqueous solution battery using the polymer compound.

2. Description of the Related Art

In these years, there has been increased demand for batteries having high energy density. As one of such batteries, there can be cited a lithium battery having a high voltage as a single cell. According to the lithium battery, use of a nonaqueous electrolytic solution makes it possible to obtain a high voltage of 3 V or more; however, the capacities per weight of the positive and negative electrode materials are not necessarily sufficient in a manner such that a capacity of 140 to 150 mAh/g is obtained in the case of cobalt lithiumate used for a positive electrode.

Accordingly, there have been made various investigations on the positive and negative electrode materials which can make larger the capacities per weight of the positive and negative electrodes, respectively; as for the positive electrode, some of these materials being investigated are oxides of metals including manganese, iron and niobium, any of which is large in weight and small in the number of reactive electrons so that a large capacity can hardly be obtained.

The investigations also involve the application of conducting polymers including polyaniline as the positive electrode materials because these polymers are light in weight; however, the number of reactive electrons per unit molecular weight of polyaniline is 0.5 and the capacity per weight of polyaniline is about 145 mAh/g, which is not much larger than the above described capacity of cobalt at lithiumate.

On the other hand, there has been known an application, as a positive electrode material, of an organo-sulfur polymer compound as a polymer compound capable of yielding a high capacity and a high energy density (see, for example, U.S. Pat. No. 4,833,048; J. Electrochem. Soc., Vol. 136, pp. 661 to 664 (1989); J. Electrochem. Soc., Vol. 136, pp. 2570 to 2575 (1989)).

The organo-sulfur polymer compound has S—S bonds in the main chain thereof, the polymer compounds being represented by R—S—S—R. The organo-sulfur polymer compound undergoes a reversible redox reaction in which organic thiolates (R—SH) are formed in the reduced state thereof with the cleaved S—S bond, and the organic thiolates are in turn bonded in the oxidized state to regenerate the S—S bond. Accordingly, when the organo-sulfur polymer compound is used as a positive electrode material, the polymer compound can conduct charge/discharge by making use of the redox reaction.

However, the organo-sulfur polymer compound has a large difference between the oxidation potential and the reduction potential so as for the reaction rate to be made slow, leading to a disadvantage that the operation temperature is needed to be elevated to a temperature of 100° C. or higher when operation as a battery is made to come into effect. When the organo-sulfur polymer compound is reduced into the organic thiolate, the molecular weight of the compound is made smaller, and hence the compound is dissolved in the electrolytic solution to diffuse outside the electrode, leading to a disadvantage that the capacity degradation tends to be caused.

SUMMARY OF THE INVENTION

It is therefore an object of the present invention to provide a polymer compound for an electrode material which can solve these disadvantages, can be operative at low temperatures, and can attain a large capacity.

Additionally, another object of the present invention is the provision of an electrode using the polymer compound for an electrode material, and a nonaqueous solution battery using the electrode as the positive electrode.

The polymer compound for an electrode material of the present invention is characterized in that the polymer compound comprises a structure in which at least one intramolecular S—S bond can be formed in a single side chain of the repeating unit so that these objects may be achieved.

The polymer compound can undergo redox reaction at low temperatures in the vicinity of room temperature through cleavage and regeneration of the S—S bond, and can provide a large capacity per weight. The polymer compound includes the S—S bond in a side chain of each of the repeating units, and the bond is formed intramolecularly, so that no reduction of the molecular weight occurs even when the S—S bond is cleaved by reduction, thus preventing the capacity degradation due to the diffusion of the compound to the outside of the electrode.

In the polymer compound of the present invention, the S—S bond forms a part of, for example, a 4- to 6-membered heterocycle; examples of the polymer compound include the compounds each comprising any one of the structures represented by the following formulas (1) to (4). The S—S bond may be originally formed in the molecule of the compound, or may be formed in the initial stages of the charge/discharge or in the electrochemical oxidation/reduction when the polymer compound for an electrode material is used as an electrode.

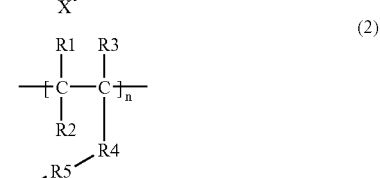

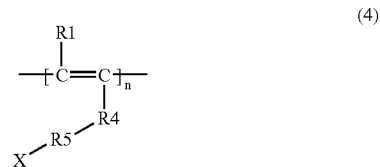

In the above formulas, R1, R2 and R3 each are a monovalent group selected from the set consisting of a hydrogen atom, a halogen atom, a lower alkyl group having 1 to 3 carbon atoms, an amino group, a hydroxy group, and a sulfone group; R4 is —CO— or —CH$_2$—; R5 is —O— or —O—CH$_2$—; and X is a heterocycle including the S—S bond.

Specific examples of such polymer compounds include the compounds each comprising any one of the structures represented by the following formulas (5) to (10).

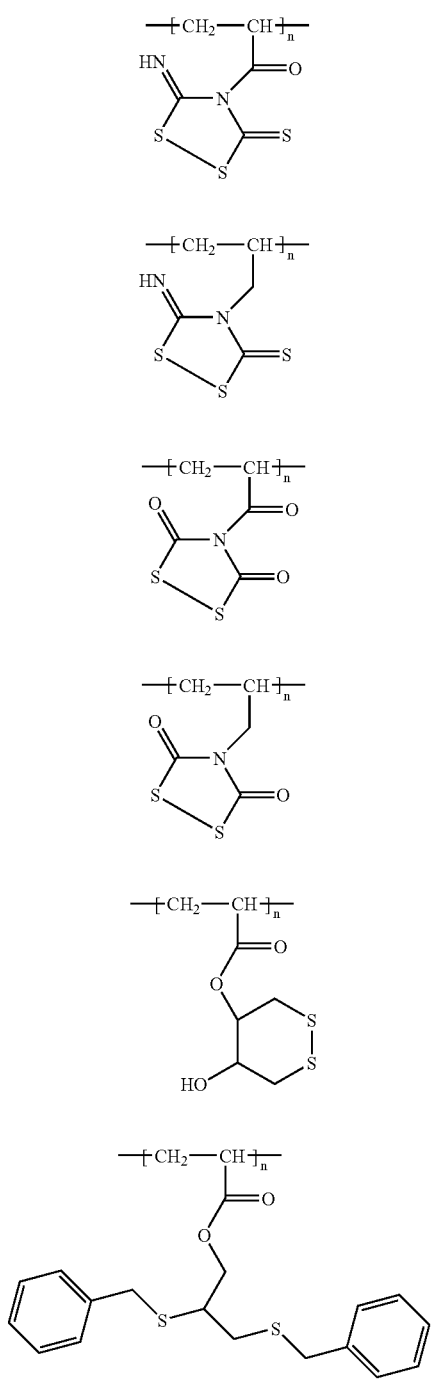

The compound represented by formula (10) can intramolecularly form the S—S bond through the electrochemical oxidation represented by the following formula (I).

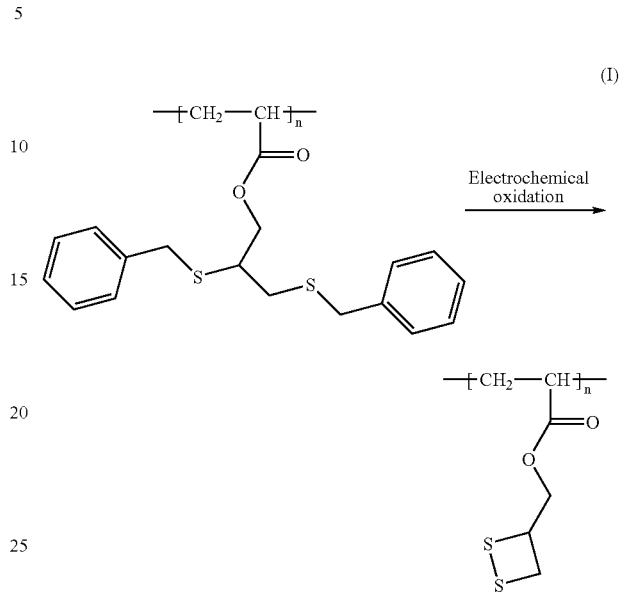

Additionally, the electrode of the present invention is characterized in that the electrode includes as the electrode material the polymer compound for an electrode material, and the nonaqueous solution battery of the present invention is characterized in that the battery comprises a positive electrode, an electrolytic solution and a negative electrode, and the positive electrode includes as the electrode material the polymer compound for an electrode material.

DETAILED DESCRIPTION OF THE PREFERRED EMBODIMENTS

Figure 1:
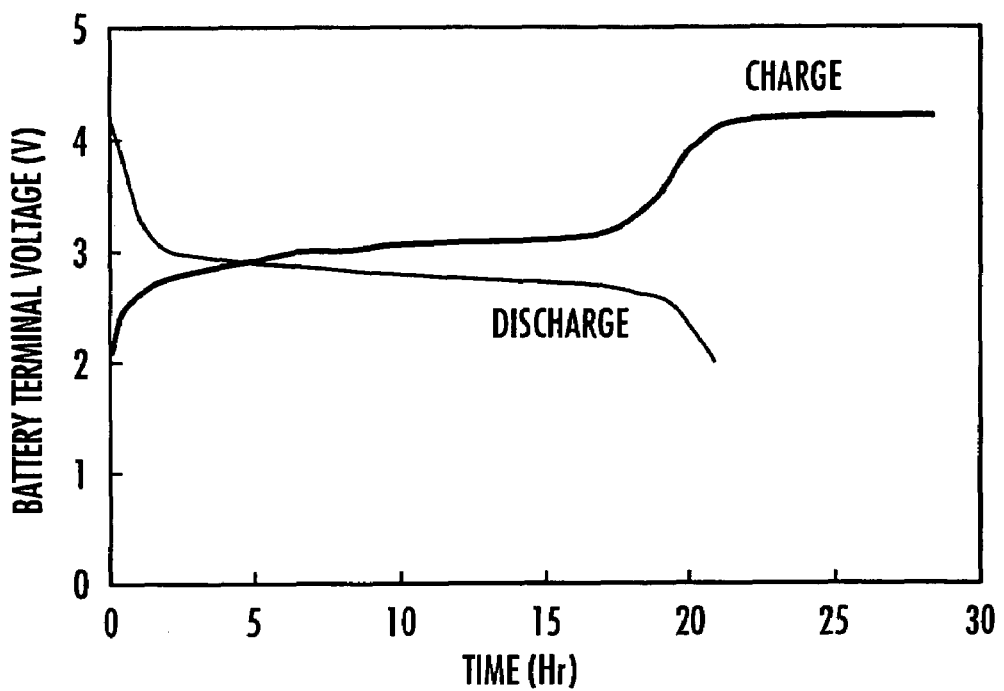
FIG. 1 is a graph showing the time variations of the battery terminal voltage, during the charge/discharge, of a nonaqueous solution battery using as the positive electrode an electrode formed of a polymer compound for an electrode material of a first embodiment.

Now, a first embodiment of the present invention will be described below.

In the present embodiment, at the beginning, 60 ml of a 33% aqueous solution of sodium hydroxide and 95 ml of chloroform were added to 14.2 g of xanthane hydride (manufactured by Tokyo Kasei Kogyo Co., Ltd.). Under stirring and cooling with ice, a solution of 9.5 g acryloyl chloride dissolved in 40 ml chloroform was added dropwise to the mixture thus obtained over a period of 10 minutes. After 4 hours of stirring, extraction with chloroform was conducted, the organic layer thus extracted was washed with a 10% hydrochloric acid, and successively washed with a saturated aqueous solution of sodium hydrogencarbonate.

Then, the solvent was dried over sodium sulfate, and thereafter the solvent was removed by distillation under a reduced pressure; the solid content thus obtained was washed with petroleum ether to yield 18.5 g of an acrylamide compound. The reaction concerned is shown in the following formula (II), A in formula (II) being the acrylamide compound.

By repeating twice the reaction concerned, about 37 g of acrylamide compound A was prepared in total.

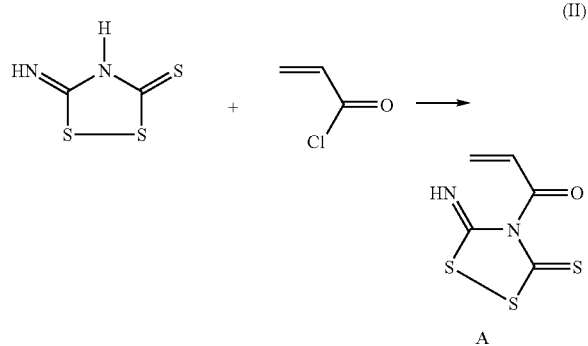

A

Next, a solution of 36 g acrylamide compound A dissolved in 61 ml toluene was placed in a 500 ml flask equipped with a nitrogen introduction tube, a stirrer, a reflux device, and a dropping buret, and 9 ml of a 4% toluene solution of benzoyl peroxide was added as a polymerization initiator to the solution under stirring while the temperature was set at 120±1.5° C. In the course of this operation, nitrogen bubbles were being made to pass through the reaction solution. Then, every about 15 minutes, the 4% toluene solution of benzoyl peroxide was added 11 times in an amount of 9 ml each time, namely, in an amount of 99 ml in total. After the addition of the polymerization initiator was completed, the reaction solution was stirred for 30 minutes under heating at the above specified temperature. On completion of the reaction, the resulting polymer was filtered out, and dissolved in toluene. To the toluene solution, 30 ml of methylene chloride was added under refluxing to purify the polymer through reprecipitation.

The above described purification operation was repeated three times, and the thus purified polymer was filtered out from methylene chloride, and dried by repeating heating and reduced-pressure cooling, to yield about 27 g of an acrylamide polymer. The reaction concerned is shown in the following formula (III), B in formula (III) being the acrylamide polymer.

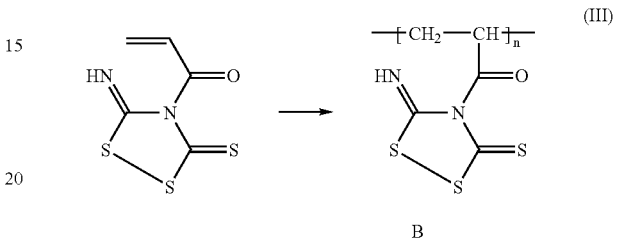

B

The acrylamide polymer B has a 5-membered ring containing sulfur and nitrogen at the end of the individual chains, a part of the 5-membered ring being formed with a S—S bond. The 5-membered ring is connected to the main chain through the intermediary of an amide bond containing a nitrogen atom involved in formation of the ring. The S—S bond is cleaved by reduction, and regenerated by oxidation.

Next, the acrylamide polymer B was grinded, and classified to obtain an about 22 g of a powder having particle sizes of 10 to 30 μm. A fraction of the powder was checked for conductivity to reveal that the acrylamide polymer B has no conductivity and hence is an electrically insulating material.

Next, 2.0 g of acetylene black as a conducting aid and 2.0 g of polytetrafluoroethylene (PTFE) as a binder were added to 16.0 g of the powder, and the mixture thus prepared was stirred fully in a small V mixer. Then, the mixture composed of the powder, acetylene black and PTFE was kneaded with an automatic mortar, and the kneaded mixture was used to form an about 0.8 mm thick sheet. A disk of 14 mm in diameter was blanked out from the sheet, and the disk was laminated with a disk of pure titanium net of 14 mm in diameter; the laminate was compressed with an oil press to integrally form a positive electrode. The weight of the positive electrode exclusive of the weight of the piece of pure titanium net was 52 mg. The positive electrode was dried at 80° C. for 16 hours under a vacuum, and then, stored in a glove box in which argon gas was circulated, the dew point of the glove box being −80° C. or lower.

A component of a commercially available coin type cell (CR2030) and the positive electrode were used to form a battery. A disk of lithium foil of 99.99% in purity, 0.2 mm in thickness, and 15.3 mm in diameter was used as the negative electrode. The separator was a polyolefin type resin disk of 30 μm in thickness and 20 mm in diameter which had been dried at 60° C. under a vacuum for 24 hours and thereafter stored in the above described glove box. The electrolytic solution used was a 1 mol/l solution of $LiClO_4$ dissolved in a mixed solvent composed of ethylene carbonate and diethyl carbonate in a ratio of 1:1 (volume ratio); 600 μl of the $LiClO_4$ solution was placed on the separator to assemble a nonaqueous solution battery.

Next, the nonaqueous solution battery was allowed to stand for 24 hours, and thereafter charge/discharge were repeated at the ambient temperature of 25±2° C. to evaluate the performance of the battery. The open circuit voltage prior to charge/discharge was 3.3 V.

The first discharge gave a termination voltage of 2.0 V and a discharge capacity of 9.4 mAh with a constant current of 0.5 mA. The following charge was carried out up to a termination voltage of 4.2 V with a constant current of 0.5 mA and thereafter charge was carried out with a constant voltage of 4.2 V until the charge current reached 0.05 mA. The charge capacity was 11.8 mAh.

The second discharge was carried out under the same conditions as in the first discharge, the discharge capacity being 10.5 mAh and the average discharge voltage being 2.75 V. The results obtained are shown in FIG. 1.

Additionally, in the nonaqueous solution battery, the discharge capacity of the 20th cycle was 9.9 mAh, yielding no significant capacity decrease in relation to the initial discharge capacity.

A calculation based on the above described results clearly shows that the electrode material of the present embodiment provides a initial capacity of about 250 mAh/g or more.

Now, a second embodiment of the present invention will be described below.

In the present embodiment, at the beginning, 4.5 g of xanthane hydride, 4.0 g of allyl bromide and 5.1 g of potassium carbonate were suspended in 65 ml of acetone, and the suspension liquid was stirred at room temperature for 4 hours, and then filtered. Then, the residual obtained by concentrating the filtrate was purified with a column to yield 6.7 g of N-allylxanthane hydride. The N-allylxanthane hydride was dissolved in 4.2 ml of chloroform, and 47 mg of 2,2'-azobisisobutylonitrile was added to this solution. The solution thus obtained was stirred at 60° C. for 3 days, and then 65 ml of acetone was added to the solution to precipitate a powder-like substance. The powder-like substance was recovered, washed with ethanol several times, and dried under a reduced pressure to yield 3.5 g of an acrylic polymer. The reaction concerned is shown in the following formula (IV), C in formula (IV) being the acrylic polymer.

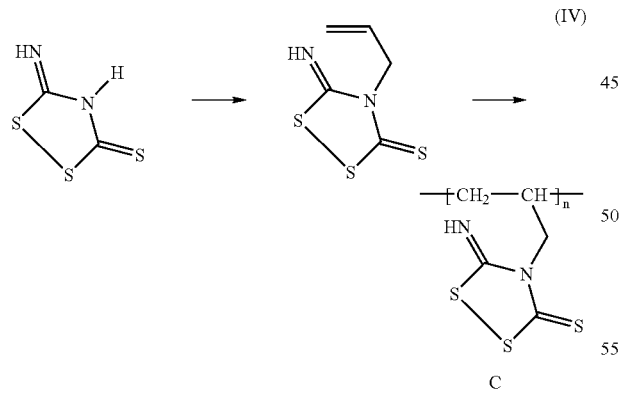

Next, the acrylic polymer C was grinded, and classified to obtain 1.9 g of a powder having particle sizes of 10 to 30 μm. A fraction of the powder was checked for conductivity to reveal that the acrylic polymer C has no conductivity and hence is an electrically insulating material.

Next, 0.2 g of acetylene black as a conducting aid and 0.2 g of PTFE as a binder were added to 1.6 g of the powder, and the mixture thus prepared was stirred fully in a small V mixer. Then, the mixture composed of the powder, acetylene black and PTFE was kneaded with an automatic mortar, and the kneaded mixture was used to form a 0.6 mm thick sheet. A disk of 14 mm in diameter was blanked out from the sheet, and the disk was laminated with a disk of pure titanium net of 14 mm in diameter; the laminate was compressed with an oil press to integrally form a positive electrode. The weight of the positive electrode exclusive of the weight of the piece of pure titanium net was 41 mg. The positive electrode was dried under a vacuum at 80° C. for 16 hours, and then, stored in a glove box in which argon gas was circulated, the dew point the of the glove box being −80° C. or lower.

Next, a nonaqueous solution battery was assembled in the same manner as in the first embodiment except that the above described positive electrode was used, and the performance of the battery thus obtained was evaluated. The open circuit voltage prior to charge/discharge was 3.5 V.

The first discharge gave a termination voltage of 2.0 V and a discharge capacity of 8.8 mAh with a constant current of 0.5 mA. The following charge was carried out up to a termination voltage of 4.2 V with a constant current of 0.5 mA and thereafter charge was carried out with a constant voltage of 4.2 V until the charge current reached 0.05 mA. The charge capacity was 10.1 mAh.

Figure 2:
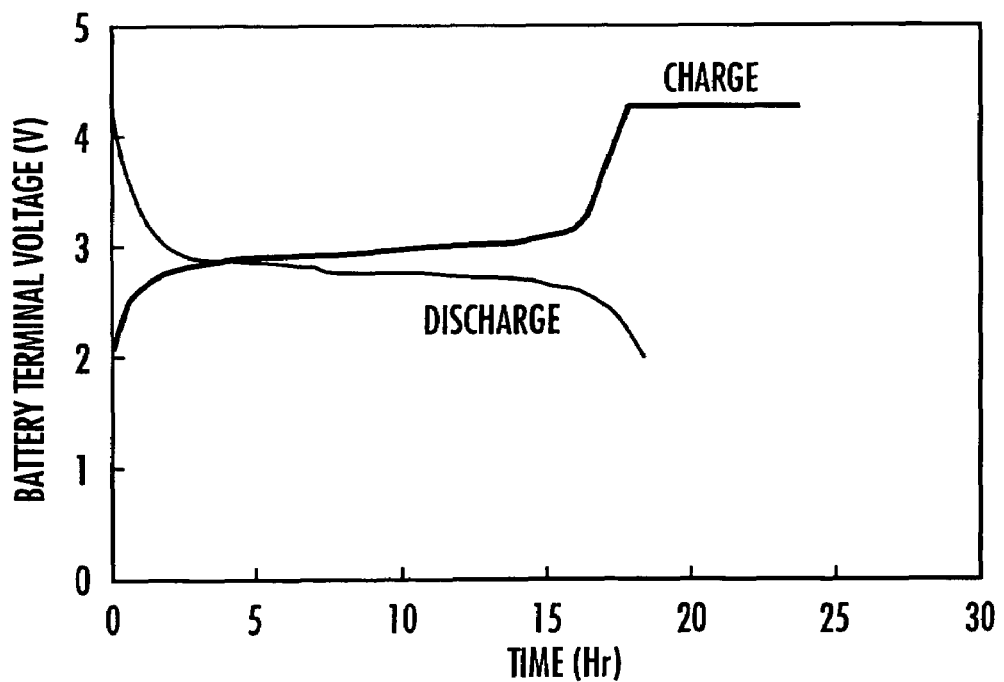
FIG. 2 is a graph showing the time variations of the battery terminal voltage, during the charge/discharge, of a nonaqueous solution battery using as the positive electrode an electrode formed of a polymer compound for an electrode material of a second embodiment.

The second discharge was carried out under the same conditions as in the first discharge, the discharge capacity being 9.2 mAh and the average discharge voltage being 2.75 V. The results obtained are shown in FIG. 2.

Additionally, in the nonaqueous solution battery, the discharge capacity of the 20th cycle was 8.9 mAh, yielding no significant capacity decrease in relation to the initial discharge capacity.

A calculation based on the above described results clearly shows that the electrode material of the present embodiment provides a initial capacity of about 280 mAh/g or more.

Now, a third embodiment of the present invention will be described below.

Figure 4:
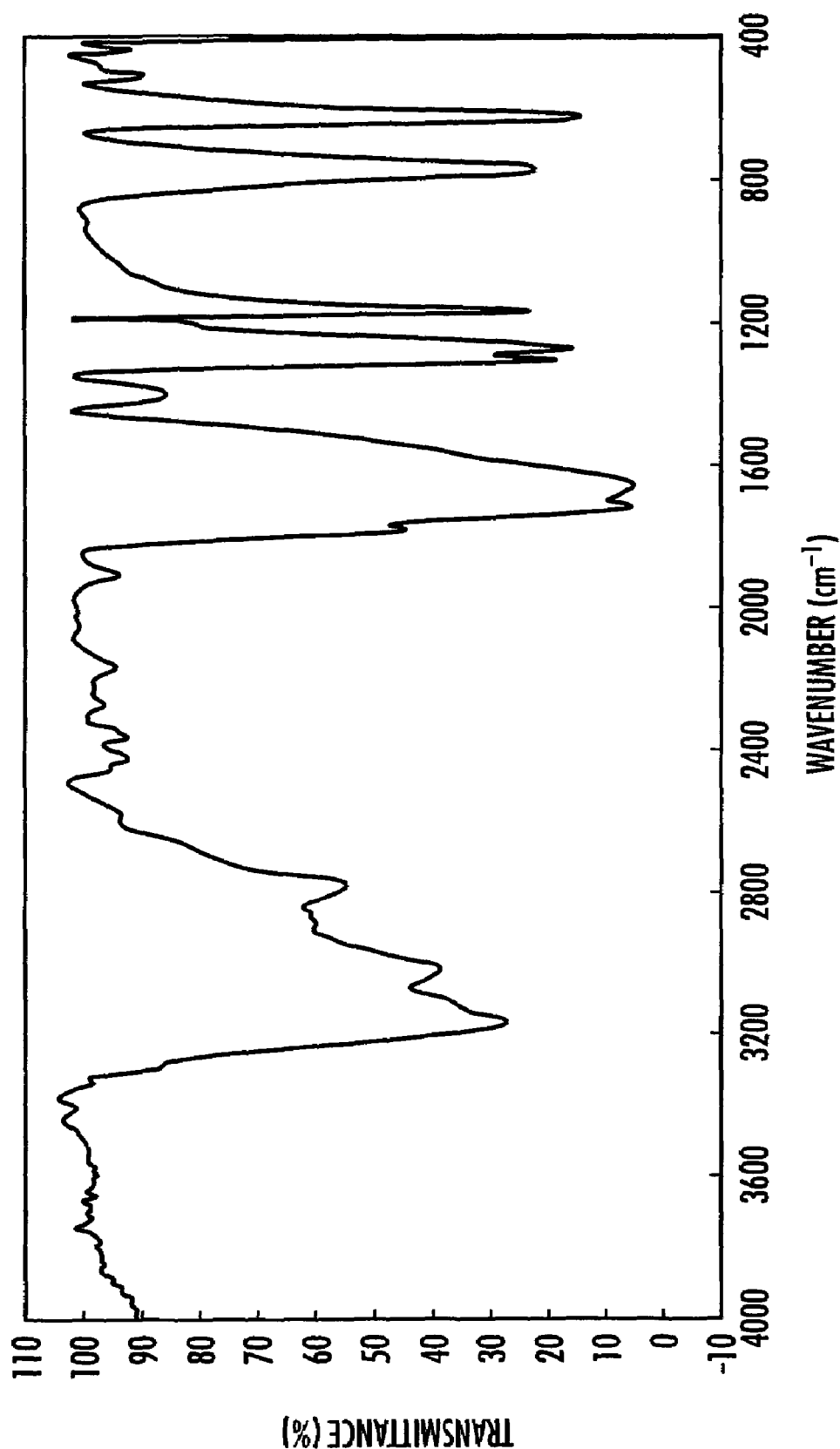
FIG. 4 is a diagram showing the infrared absorption spectrum of a compound to be a raw material for a polymer compound for an electrode material of a fourth embodiment.

In the present embodiment, at the beginning, 1,2,4-dithiazolidine-3,5-dione represented by the following formula D was synthesized according to the method well known in the art (see U.S. Pat. No. 5,852,168), to obtain about 25 g of a sample. The obtained sample was subjected to elemental analysis, NMR analysis and IR analysis, to reveal that the sample was a substance very high in purity to ensure the structure represented by formula D. An infrared absorption spectrum of 1,2,4-dithiazolidine-3,5-dione is shown in FIG. 4.

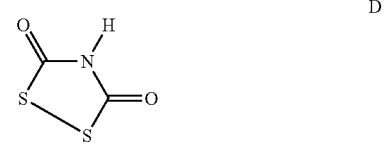

Next, 60 ml of a 33% aqueous solution of sodium hydroxide and 95 ml of chloroform were added to 12 g of 1,2,4-dithiazolidine-3,5-dione. Under stirring and cooling with ice, a solution of 11 g acryloyl chloride dissolved in 45 ml chloroform was added dropwise to the mixture thus obtained over a period of 10 minutes. After 4 hours of stirring, extraction with chloroform was conducted, the organic layer thus extracted was washed with a 10% hydrochloric acid, and successively washed with a saturated solution of sodium hydrogencarbonate.

Then, the solvent of the obtained solution was dried over sodium sulfate, and thereafter the solvent was removed by distillation under a reduced pressure; the solid content thus obtained was washed with petroleum ether to yield 17.4 g of an acrylamide compound. The reaction concerned is shown in the following formula (V), E in formula (V) being the acrylamide compound.

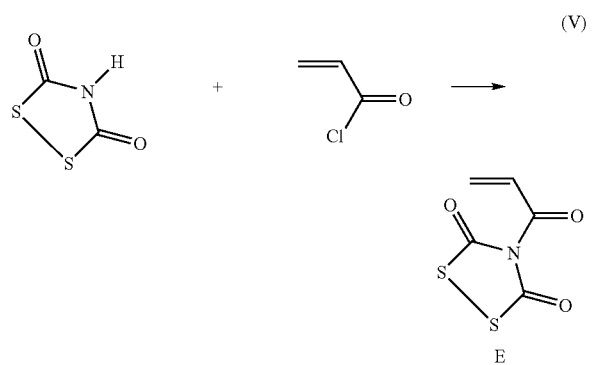

Next, a solution of 34 g acrylamide compound E dissolved in 65 ml toluene was placed in a 500 ml flask equipped with a nitrogen introduction tube, a stirrer, a reflux device, and a dropping buret, and 10 ml of a 4% toluene solution of benzoyl peroxide was added as a polymerization initiator to the solution under stirring while the temperature was set at 120±1.5° C. and nitrogen bubbles were being made to pass through the reaction solution. Then, every about 15 minutes, the 4% toluene solution of benzoyl peroxide was added 11 times in an amount of 10 ml each time, namely, in an amount of 110 ml in total. After the addition of the polymerization initiator was completed, the reaction solution was stirred for 30 minutes under heating at the above specified temperature. On completion of the reaction, the resulting polymer was filtered out, and dissolved in toluene. To the toluene solution, 41 ml of methylene chloride was added under refluxing to purify the polymer through reprepication.

The above described purification operation was repeated three times, and the thus purified polymer was filtered out from methylene chloride, and dried by repeating heating and reduced-pressure cooling, to yield about 32 g of an acrylamide polymer. The reaction concerned is shown in the following formula (VI), F in formula (VI) being the acrylamide polymer.

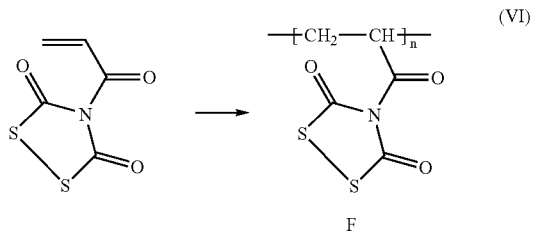

Next, the acrylamide polymer F was grinded, and classified to obtain 0.3 g of a powder having particle sizes of 10 to 30 µm. A fraction of the powder was checked for conductivity to reveal that the arylamide polymer F has no conductivity to be an electrically insulating material.

Next, 0.025 g of acetylene black as a conducting aid and 0.025 g of PTFE as a binder were added to 0.2 g of the powder, and the mixture thus prepared was stirred fully with a small V mixer. Then, the mixture composed of the powder, acetylene black and PTFE was kneaded with an automatic mortar, and the kneaded mixture was used to form an about 0.6 mm thick sheet. A disk of 14 mm in diameter was blanked out from the sheet, and the disk was laminated with a disk of pure titanium net of 14 mm in diameter; the laminate was compressed with an oil press to integrally form a positive electrode. The weight of the positive electrode exclusive of the weight of the piece of pure titanium net was 39 mg. The positive electrode was dried under a vacuum at 80° C. for 16 hours, and then, stored in a glove box in which argon gas was circulated, the dew point of the glove box being −80° C. or lower.

Next, a nonaqueous solution battery was assembled in the same manner as in the first embodiment except that the above described positive electrode was used, and the performance of the battery thus obtained was evaluated. The open circuit voltage prior to charge/discharge was 4.01 V.

The first discharge gave a termination voltage of 2.0 V and a discharge capacity of 8.6 mAh with a constant current of 0.5 mA. The following charge was carried out up to a termination voltage of 4.2 V with a constant current of 0.5 mA and thereafter charge was carried out with a constant voltage of 4.2 V until the charge current reached 0.05 mA. The charge capacity was 9.6 mAh.

Figure 3:
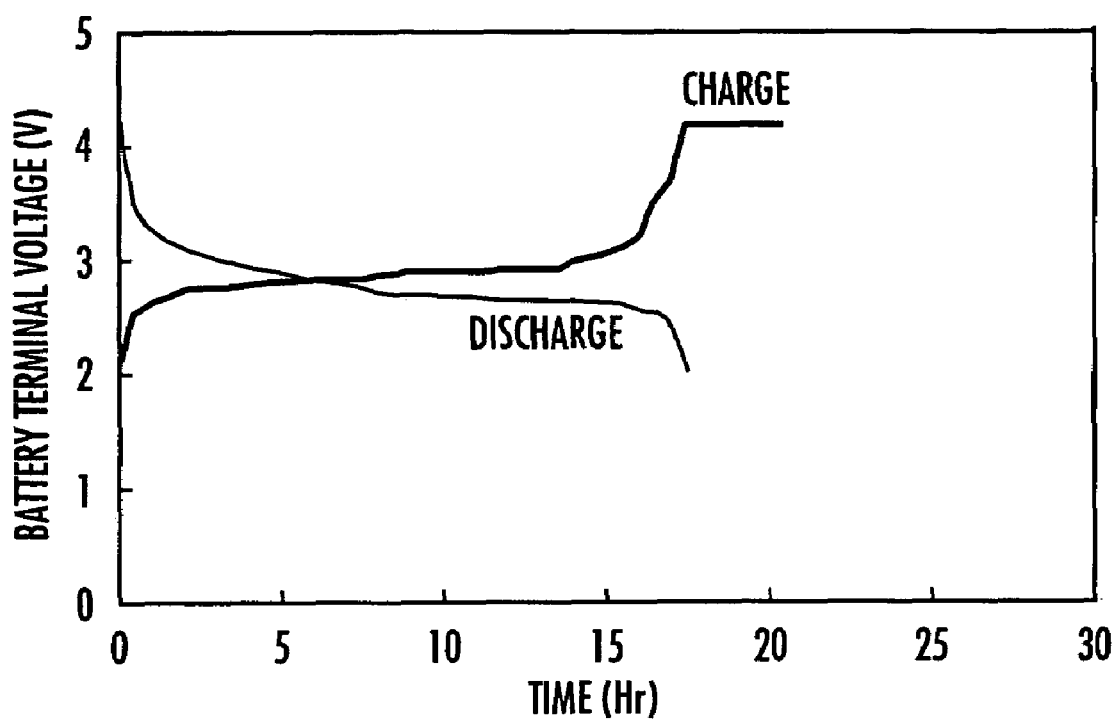
FIG. 3 is a graph showing the time variations of the battery terminal voltage, during the charge/discharge, of a nonaqueous solution battery using as the positive electrode an electrode formed of a polymer compound for an electrode material of a third embodiment.

The second discharge was carried out under the same conditions as in the first discharge, the discharge capacity being 8.8 mAh and the average discharge voltage being 2.69 V. The results obtained are shown in FIG. 3.

Additionally, in the nonaqueous solution battery, the discharge capacity of the 20th cycle was 8.4 mAh, yielding no significant capacity decrease in relation to the initial discharge capacity.

A calculation based on the above described results clearly shows that the electrode material of the present embodiment provides a initial capacity of about 280 mAh/g or more.

Now, a fourth embodiment of the present invention will be described below.

In the present embodiment, at the beginning, 1,2,4-dithiazolidine-3,5-dione represented by the above described formula D was synthesized according to the method well known in the art (see U.S. Pat. No. 5,852,168). The obtained sample was subjected to elemental analysis, NMR analysis and IR analysis, to reveal that the sample was a substance very high in purity to ensure the structure represented by formula D. An infrared absorption spectrum of 1,2,4-dithiazolidine-3,5-dione is shown in FIG. 4.

Next, 4.0 g of the above 1,2,4-dithiazolidine-3,5-dione, 4.0 g of allyl bromide and 5.8 g of potassium carbonate were suspended in 65 ml of acetone, and the suspension liquid was stirred at room temperature for 6 hours, and then filtered. Then, the residual obtained by concentrating the filtrate was purified with a column to yield 5.8 g of N-allyl-1,2,4-dithiazolidine-3,5-dione. The N-allyl-1,2,4-dithiazolidine-3,5-dione was dissolved in 4.5 ml of chloroform, and 50 mg of 2,2′-azobisisobutylonitrile was added to this solution. The solution thus obtained was stirred at 60° C. for 4 days, and then 100 ml of acetone was added to the solution to precipitate a powder-like substance. The powder-like substance was recovered, washed with ethanol several times, and dried under a reduced pressure to yield 2.8 g of an allyl polymer.

Figure 5:
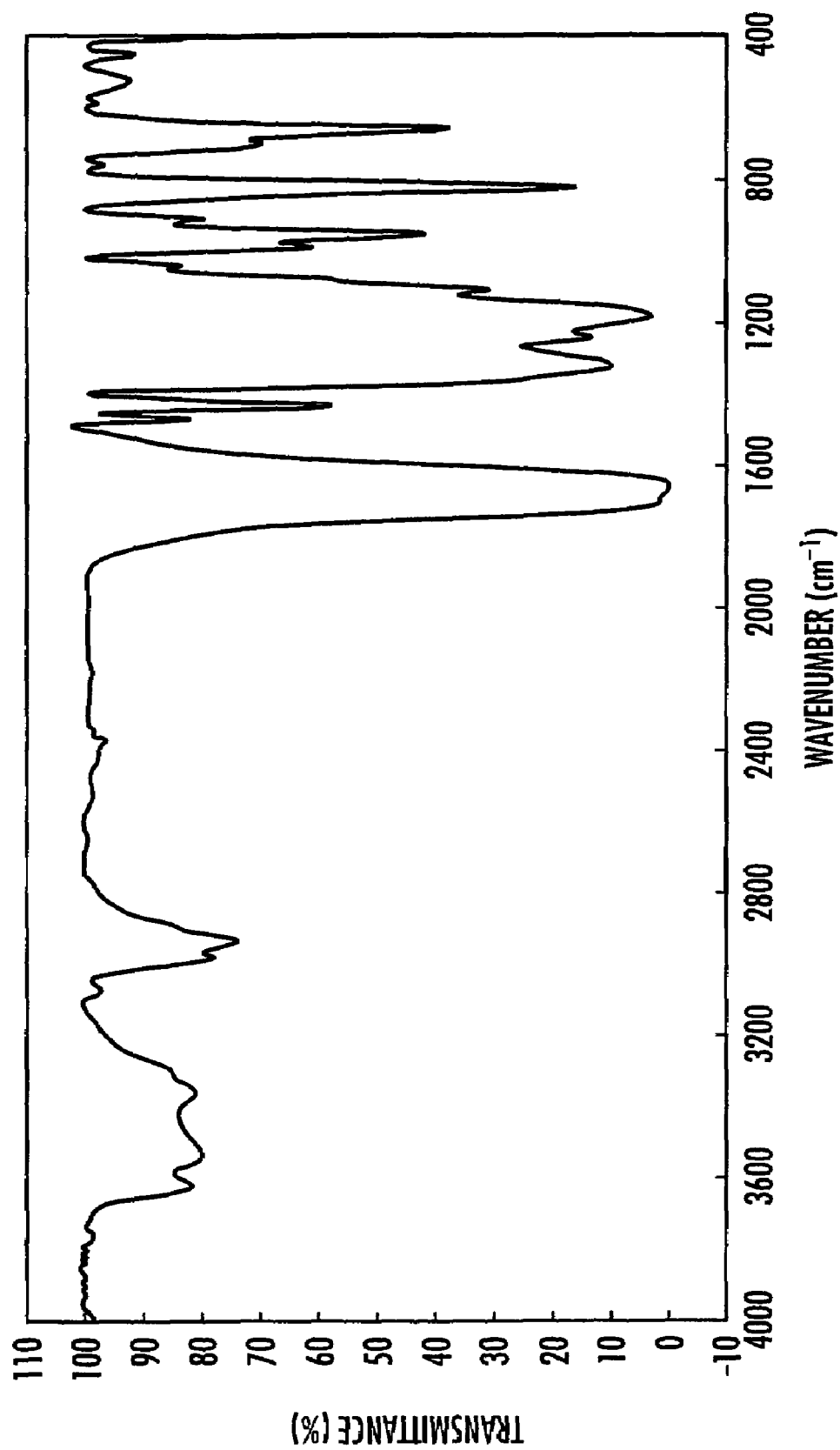
FIG. 5 is a diagram showing the infrared absorption spectrum of a polymer compound for an electrode material of a fourth embodiment.

The reaction concerned is shown in the following formula (VII), G in formula (VII) being the allyl polymer. An infrared absorption spectrum of the allyl polymer G is shown in FIG. 5.

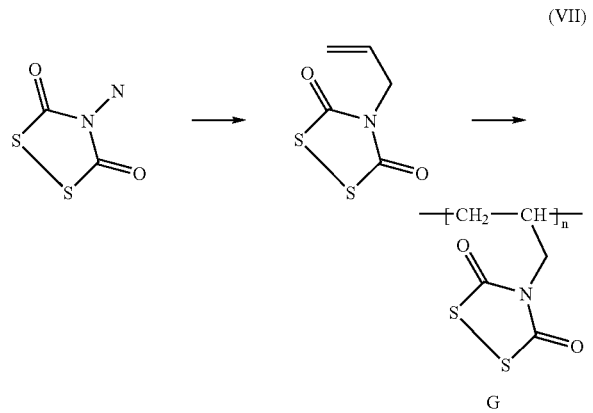

Next, the allyl polymer G was grinded, and classified to obtain 2.1 g of a powder having particle sizes of 10 to 30 μm. A fraction of the powder was checked for conductivity to reveal that the allyl polymer G has no conductivity and hence is an electrically insulating material.

Next, 0.25 g of acetylene black as a conducting aid and 0.25 g of PTFE as a binder were added to 2.0 g of the powder, and the mixture thus prepared was stirred fully in a small V mixer. Then, the mixture composed of the powder, acetylene black and PTFE was kneaded with an automatic mortar, and the kneaded mixture was used to form an about 0.6 mm thick sheet. A disk of 14 mm in diameter was blanked out from the sheet, and the disk was laminated with a disk of pure titanium net of 14 mm in diameter; the laminate was compressed with an oil press to integrally form a positive electrode. The weight of the positive electrode exclusive of the weight of the piece of pure titanium net was 37 mg. The positive electrode was dried under a vacuum at 80° C. for 16 hours, and then, stored in a glove box in which argon gas was circulated, the dew point of the glove box being −80° C. or lower.

Next, a nonaqueous solution battery was assembled in the same manner as in the first embodiment except that the above described positive electrode was used, and the performance of the battery thus obtained was evaluated. The open circuit voltage prior to charge/discharge was 3.98 V.

The first discharge gave a termination voltage of 2.0 V and a discharge capacity of 8.8 mAh with a constant current of 0.5 mA. The following charge was carried out up to a termination voltage of 4.2 V with a constant current of 0.5 mA and thereafter charge was carried out with a constant voltage of 4.2 V until the charge current reached 0.05 mA. The charge capacity was 9.5 mAh.

Figure 6:
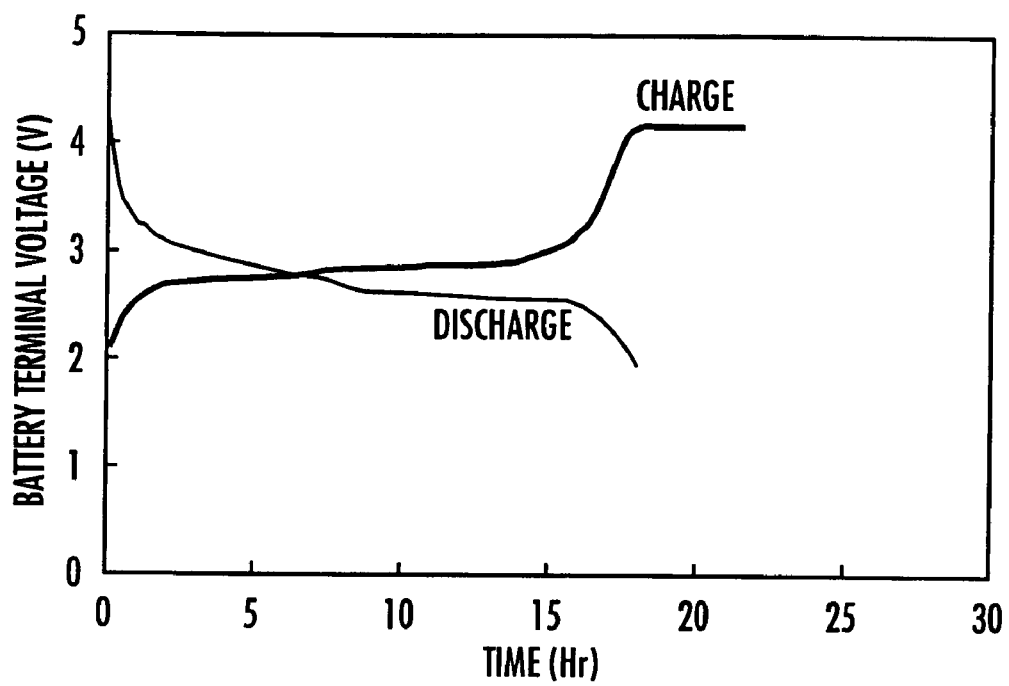
FIG. 6 is a graph showing the time variations of the battery terminal voltage, during the charge/discharge, of a nonaqueous solution battery using as the positive electrode an electrode formed of the polymer compound for an electrode material of the fourth embodiment.

The second discharge was carried out under the same conditions as in the first discharge, the discharge capacity being 9.0 mAh and the average discharge voltage being 2.66 V. The results obtained are shown in FIG. 6.

Additionally, in the nonaqueous solution battery, the discharge capacity of the 20th cycle was 8.7 mAh, yielding no significant capacity decrease in relation to the initial discharge capacity.

A calculation based on the above described results clearly shows that the electrode material of the present embodiment provides a initial capacity of about 300 mAh/g or more.

Now, a fifth embodiment of the present invention will be described below.

In the present embodiment, at the beginning, 7.6 g of trans-1,2-dithian-4,5-diol and 5 g of triethylamine were added to 50 ml of dichloromethane. The solution thus obtained was stirred at room temperature for 30 minutes, and thereafter cooled to 0° C. with ice. Then, a solution of 4.5 g acryloyl chloride dissolved in 40 ml chloroform was added dropwise to the solution over a period of 30 minutes. After 1 hour of stirring of the solution thus prepared, the reaction solution thus obtained was poured into 100 ml of water, and the mixture thus obtained was further stirred.

Extraction of the organic layer of the reaction solution was conducted, the organic layer thus extracted was dehydrated with sodium sulfate anhydride, and then dried under a reduced pressure to yield 5.6 g of an acrylic ester compound. The reaction concerned is shown in the following formula (VIII), H in formula (VIII) being the acrylate compound.

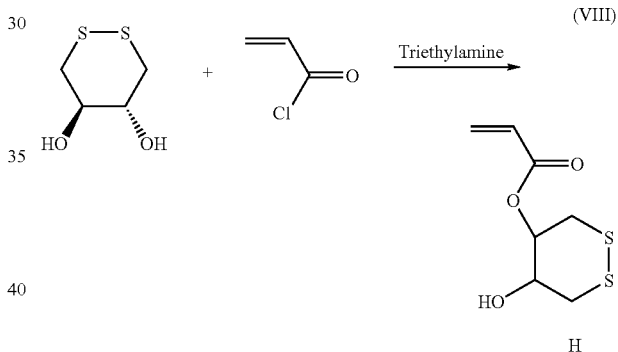

Next, a solution of 5.0 g acrylic ester compound H dissolved in 30 ml toluene was placed in a 500 ml flask equipped with a nitrogen introduction tube, a stirrer, a reflux device, and a dropping buret, and 5 ml of a 4% toluene solution of benzoyl peroxide was added as a polymerization initiator to the solution under stirring while the temperature was set at 120±1.5° C. and nitrogen bubbles were being made to pass through the reaction solution. Then, every about 15 minutes, the 4% toluene solution of benzoyl peroxide was added 10 times in an amount of 5 ml each time, namely, in an amount of 50 ml in total. After the addition of the polymerization initiator was completed, the reaction solution was stirred for 30 minutes under heating at the above specified temperature. On completion of the reaction, the resulting polymer was filtered out, and dissolved in toluene. To the toluene solution, 20 ml of methylene chloride was added under refluxing to purify the polymer through reprecipitation.

The above described purification operation was repeated three times, and the thus purified polymer was filtered out from methylene chloride, and dried by repeating heating and reduced-pressure cooling, to yield 3.0 g of a polyacrylic ester derivative. The reaction concerned is shown in the following formula (IX), J in formula (IX) being the polyacrylic ester derivative.

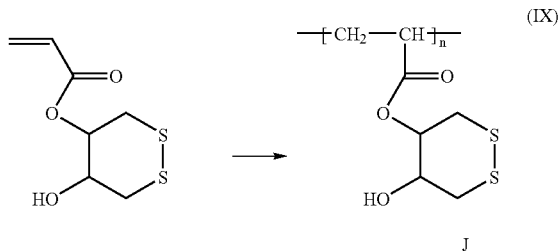

The polyacrylic ester derivative J has a 6-membered ring containing sulfur at the end of the single chain, the 6-membered ring being connected to the main chain through the intermediary of an ester bond. The S—S bond is cleaved by reduction, and regenerated by oxidation.

Next, the polyacrylic ester derivative J was grinded, and classified to obtain an about 2.8 g of a powder having particle sizes of 10 to 30 μm. A fraction of the powder was checked for conductivity to reveal that the polyacrylic ester derivative J has no conductivity and hence is an electrically insulating material.

Next, 0.2 g of acetylene black and 0.2 g of PTFE were added to 1.6 g of the powder, and the mixture thus prepared was stirred fully in a small V mixer. Then, the mixture composed of the powder, acetylene black and PTFE was kneaded with an automatic mortar, and the kneaded mixture was used to form an about 0.8 mm thick sheet. A disk of 14 mm in diameter was blanked out from the sheet, and the disk was laminated with a disk of pure titanium net of 14 mm in diameter; the laminate was compressed with an oil press to integrally form a positive electrode. The weight of the positive electrode exclusive of the weight of the piece of pure titanium net was 50 mg. The positive electrode was dried under a vacuum at 80° C. for 16 hours, and then, stored in a glove box in which argon gas was circulated, the dew point of the glove box being −80° C. or lower.

Next, a nonaqueous solution battery was assembled in the same manner as in the first embodiment except that the above described positive electrode was used, and the performance of the battery thus obtained was evaluated. The open circuit voltage prior to charge/discharge was 3.42 V.

The first discharge gave a termination voltage of 2.0 V and a discharge capacity of 9.6 mAh with a constant current of 0.5 mA. The following charge was carried out up to a termination voltage of 4.25 V with a constant current of 0.5 mA and thereafter charge was carried out with a constant voltage of 4.25 V until the charge current reached 0.05 mA. The charge capacity was 11.1 mAh.

Figure 7:
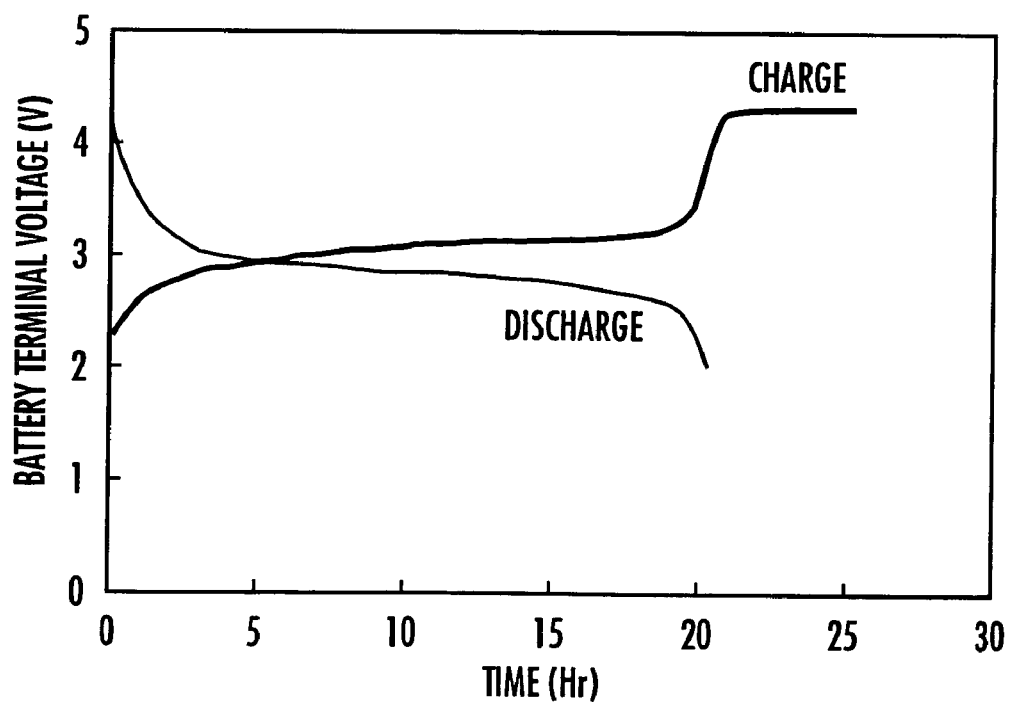
FIG. 7 is a graph showing the time variations of the battery terminal voltage, during the charge/discharge, of a nonaqueous solution battery using as the positive electrode an electrode formed of a polymer compound for an electrode material of a fifth embodiment.

The second discharge was carried out under the same conditions as in the first discharge, the discharge capacity being 10.2 mAh and the average discharge voltage being 2.77 V. The results obtained are shown in FIG. 7.

Additionally, in the nonaqueous solution battery, the discharge capacity of the 20th cycle was 9.6 mAh, yielding no significant capacity decrease in relation to the initial discharge capacity.

A calculation based on the above described results clearly shows that the electrode material of the present embodiment provides a initial capacity of about 250 mAh/g or more.

Now, a sixth embodiment of the present invention will be described below.

In the present embodiment, at the beginning, 6.2 g of 1,2-dithioglycerol (manufactured by Sigma-Aldrich Corp.) and 12.6 g of benzoyl chloride were added to 10 ml of ethanol. The solution thus obtained was stirred under refluxing for 2 hours, then cooled to room temperature, and thereafter an alkaline solution of 4 g sodium hydroxide dissolved in 100 ml distilled water was added to the solution. Then, 100 ml of ether was added to the solution, and the ether layer was extracted to yield an ether solution of the reaction product. Magnesium sulfate anhydride was added to the ether solution. The ether solution was stirred for 2 hours, and filtered. The filterate was distilled to yield 11.1 g of 1,2-dithioglycerol-S, S'-benzylether. The reaction concerned is shown in the following formula (X).

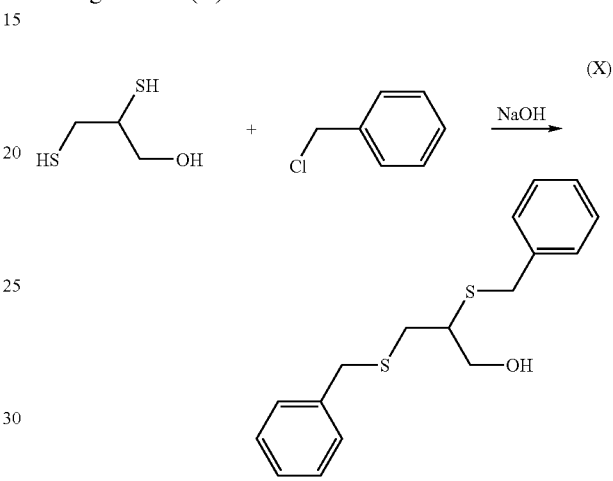

Next, 9.1 g of the above described 1,2-dithioglycerol-S,S'-benzylether and 3 g of triethylamine were added to 50 ml of dichloromethane. The solution thus obtained was stirred at room temperature for 30 minutes, and then cooled to 0° C. with ice. A solution of 2.7 g acryloyl chloride dissolved in 40 ml chloroform was added dropwise to the solution thus obtained over a period of 30 minutes. After 1 hour of stirring, the resulting reaction solution was poured into 100 ml of water, and the mixture thus obtained was further stirred.

Next, the organic layer of the reaction solution was extracted, the extractive was dehydrated with sodium sulfate anhydride, and then dried under a reduced pressure to yield 6.4 g of an acrylic ester compound. The reaction concerned is shown in the following formula (XI), K in formula (XI) being the acrylic ester compound.

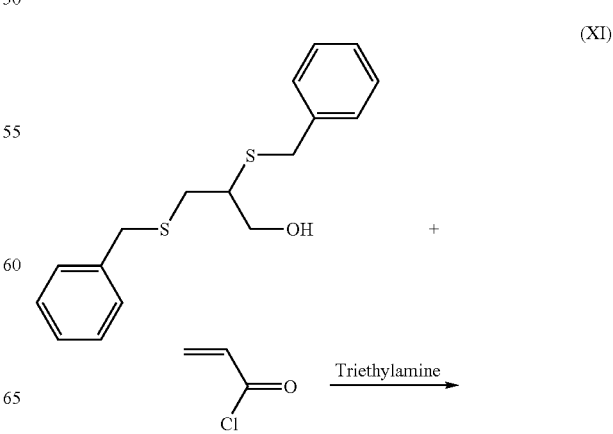

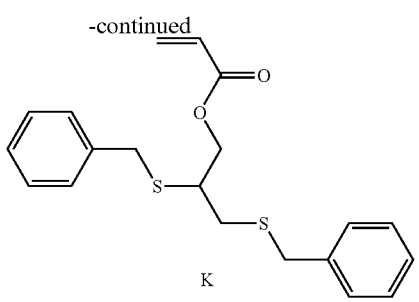

K

Next, a solution of 5.0 g acrylic ester compound K dissolved in 30 ml toluene was placed in a 500 ml flask equipped with a nitrogen introduction tube, a stirrer, a reflux device, and a dropping buret, and 5 ml of a 4% toluene solution of benzoyl peroxide was added as a polymerization initiator to the solution under stirring while the temperature was set at 120±1.5° C. and nitrogen bubbles were being made to pass through the reaction solution. Then, every about 15 minutes, the 4% toluene solution of benzoyl peroxide was added 10 times in an amount of 5 ml each time, namely, in an amount of 50 ml in total. After the addition of the polymerization initiator was completed, the reaction solution was stirred for 30 minutes under heating at the above specified temperature. On completion of the reaction, the resulting polymer was filtered out, and dissolved in toluene. To the toluene solution, 30 ml of methylene chloride was added under refluxing to purify the polymer through reprecipitation.

The above described purification operation was repeated three times, and the thus purified polymer was filtered out from methylene chloride, and dried by repeating heating and reduced-pressure cooling, to yield 2.1 g of a polyacrylic ester derivative. The reaction concerned is shown in the following formula (XII), L in formula (XII) being the polyacrylic ester derivative.

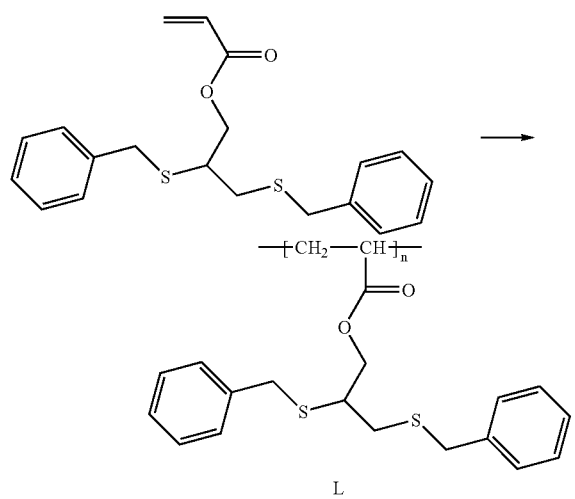

(XII)

L

Next, a fraction of the polyacrylate derivative L was checked for conductivity to reveal that the polyacrylate derivative L has no conductivity and hence is an electrically insulating material.

The polyacrylic ester derivative L, through reaction with an oxidant or electrochemical oxidation reaction thereof, can give a polyacrylic ester derivative denoted by M in the following formula (XIII).

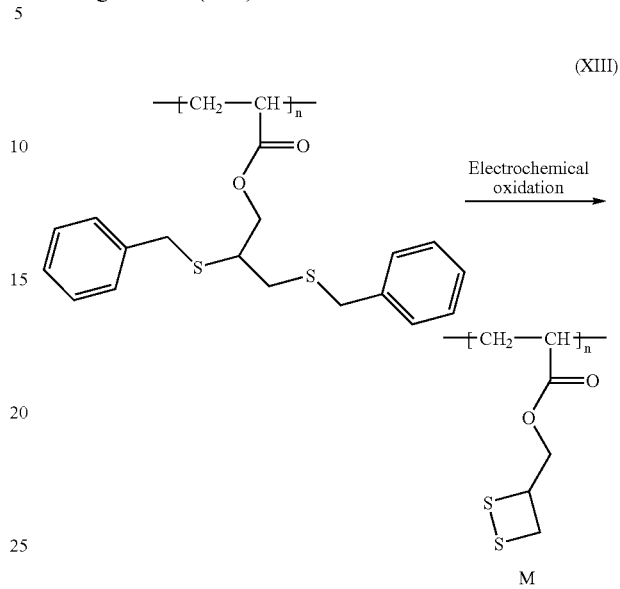

(XIII)

M

The polyacrylic ester derivative M has a 4-membered ring containing sulfur at the end of the single chain, the 4-membered ring being connected to the main chain through the intermediary of an ester bond. The S—S bond is cleaved by reduction, and regenerated by oxidation.

Next, 0.4 g of acetylene black and 0.2 g of PTFE were added to 1.4 g of the polyacrylic ester derivative L, and the mixture thus prepared was stirred fully in a small V mixer. Then, the mixture composed of the polyacrylic ester derivative L, acetylene black and PTFE was kneaded with an automatic mortar, and the kneaded mixture was used to form an about 0.8 mm thick sheet. A disk of 14 mm in diameter was blanked out from the sheet, and the disk was laminated with a disk of pure titanium net of 14 mm in diameter; the laminate was compressed with an oil press to integrally form a positive electrode. The weight of the positive electrode exclusive of the weight of the piece of pure titanium net was 28 mg. The electrode was dried under a vacuum at 80° C. for 16 hours, and then, stored in a glove box in which argon gas was circulated, the dew point of the glove box being −80° C. or lower.

Next, the above described electrode was used as the working electrode; a 20 mm×20 mm piece of 0.2 mm thick lithium foil of 99.99% in purity is laminated with a 20 mm×20 mm pure titanium net, and the laminate was compressed with an oil press to integrally form an electrode; two of such an electrode were used as the counter electrode and the reference electrode, respectively; and the working, counter and reference electrodes were dipped into an electrolytic solution contained in a beaker. The electrolytic solution used was 100 ml of a 1 mol/l solution of LiClO$_4$ dissolved in a mixed solvent composed of ethylene carbonate and diethyl carbonate in a ratio of 1:1 (volume ratio). The working electrode was electrolytic oxidized with a current of 0.05 mA for 59 hours, the voltage between the reference electrode and the working electrode being 1.91 V at the start and 4.31 V at the end. Consequently, the polyacrylic ester derivative L constituting the working electrode was electrochemically oxidized to form the polyacrylate derivative M shown in formula (XIII) by electrolytic oxidation.

Next, a nonaqueous solution battery was assembled in the same manner as in the first embodiment except that the above described working electrode was used as the positive electrode, and the performance of the battery thus obtained was evaluated. The open circuit voltage prior to charge/discharge was 4.07 V.

The first discharge gave a termination voltage of 2.0 V and a discharge capacity of 2.89 mAh with a constant current of 0.1 mA. The following charge was carried out up to a termination voltage of 4.2 V with a constant current of 0.1 mA and thereafter charge was carried out with a constant voltage of 4.2 V until the charge current reached 0.01 mA. The charge capacity was 2.97 mAh.

Figure 8:
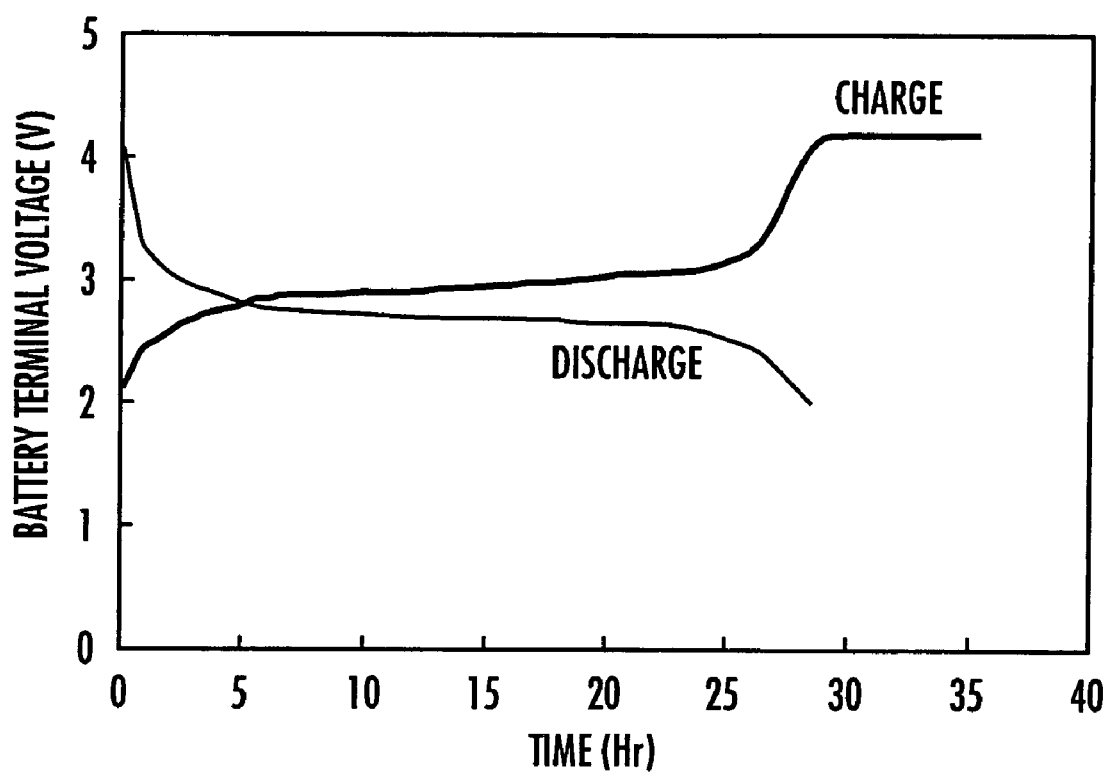
FIG. 8 is a graph showing the time variations of the battery terminal voltage, during the charge/discharge, of a nonaqueous solution battery using as the positive electrode an electrode formed of a polymer compound for an electrode material of a sixth embodiment.

The second discharge was carried out under the same conditions as in the first discharge, the discharge capacity being 2.85 mAh and the average discharge voltage being 2.69 V. The results obtained are shown in FIG. 8.

Additionally, in the nonaqueous solution battery, the discharge capacity of the 20th cycle was 2.77 mAh, yielding no significant capacity decrease in relation to the initial discharge capacity.

A calculation based on the above described results clearly shows that the electrode material of the present embodiment provides a initial capacity of about 295 mAh/g or more.

In the above described embodiments, the positive electrodes were formed using acetylene black as an conducting aid and PTFE as a binder together with the polymer compounds for an electrode material obtained in the embodiments. However, as the conducting aid, other carbon materials, metal powders, conducting polymers and the like may be used; additionally, as the binder, any polymer may be used as long as the polymer is one of the polymers usually used in forming electrodes.

Examples of the above described carbon material include Ketchen Black (R), graphite and scale-like graphite, in addition to the above described acetylene black. Examples of the above described metal powders include powders of nickel, titanium and silver and the like. Examples of the above described conducting polymers include polyaniline, polypyrrole and polyacetylene and the like.

On the other hand, examples of the polymers to be used for the above described binder include polyvinylidene fluoride, and the like, in addition to the above described PTFE.

Additionally, although the polymer compounds in the above described embodiments each have a main chain solely formed of carbon-carbon single bonds, the main chain of the polymer compound may comprise carbon-carbon double bonds or phenylene groups as well as carbon-carbon single bonds.

What is claimed is:

1. A polymer compound for an electrode material, comprising a structure capable of intramolecularly forming at least one S—S bond in a single side chain of the repeating unit thereof, selected from the group consisting of any one of the structures represented by the following formulas (5) to (10):

 (5)

 (6)

 (7)

 (8)

 (9)

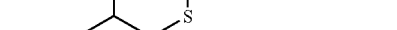 (10)

2. The polymer compound for an electrode material according to claim 1, wherein said S—S bond constitutes a part of a heterocycle.

3. The polymer compound for an electrode material according to claim 2, wherein said heterocycle is a 4- to 6-membered ring.

* * * * *

UNITED STATES PATENT AND TRADEMARK OFFICE
CERTIFICATE OF CORRECTION

PATENT NO. : 7,442,758 B2  
APPLICATION NO. : 11/008250  
DATED : October 28, 2008  
INVENTOR(S) : Hiroshi Uemachi et al.

It is certified that error appears in the above-identified patent and that said Letters Patent is hereby corrected as shown below:

On the Title Page

Item (73), Assignees, please delete "Sensa Corporation, Ishikawa (JP)" and substitute therefor -- Polythione Co., Ltd., Ishikawa (JP) --.

Signed and Sealed this

Twenty-fourth Day of March, 2009

JOHN DOLL  
*Acting Director of the United States Patent and Trademark Office*